United States Patent

[11] 3,576,405

[72] Inventor William L. Dollenmayer
Lexington, Ky.
[21] Appl. No. 796,372
[22] Filed Feb. 4, 1969
Division of Ser. No. 452,102, April 30, 1965, Pat. No. 3,426,161.
[45] Patented Apr. 27, 1971
[73] Assignee International Business Machines Corporation
Armonk, N.Y.

[54] UNITARY REGISTRATION APPARATUS FOR DICTATING MACHINES AND SYSTEMS FOR MARKING DICTATION INTERVALS
7 Claims, 24 Drawing Figs.

[52] U.S. Cl. .................................................... 179/100.1, 179/6E
[51] Int. Cl. .................................................... H04m 11/10, G11b 21/12
[50] Field of Search .......................................... 179/6 (R), 100.1 (DR)

[56] References Cited

UNITED STATES PATENTS

| | | | |
|---|---|---|---|
| 2,601,154 | 6/1952 | Kruegar ........................ | 179/100.2 |
| 3,197,562 | 6/1965 | Happold et al. .............. | 179/6 |
| 3,200,385 | 8/1965 | Welsh.......................... | 179/100.2 |
| 3,288,941 | 11/1966 | Langendorf et al........... | 179/100.1 |
| 2,800,531 | 7/1957 | Kobler.......................... | 179/6 |

*Primary Examiner*—Bernard Konick
*Assistant Examiner*—Raymond F. Cardillo, Jr.
*Attorneys*—Hanifin and Jancin and D. Kendall Cooper

ABSTRACT: The invention relates to registration devices for dictating equipment for indicating the relative position of a transducer with respect to a record media. The registration apparatus comprises a pinwheel memory with individual settable pins that indicate a particular point of reference along a helical track. Prior to any backspacing operation of the transducer for reviewing previously dictated material, the pinwheel memory is set to indicate the exact point of farthest advance during the dictating interval just completed. Subsequently, the memory control portions control the drive to insure that the transducer returns to the point of farthest advance. In the next dictating interval, the same set pin serves as a letter lockout to prevent review of material previously dictated.

INVENTOR
WILLIAM L. DOLLENMAYER

UNITARY REGISTRATION APPARATUS FOR DICTATING MACHINES AND SYSTEMS FOR MARKING DICTATION INTERVALS

The present case is a divisional case of application Ser. No. 452,102, now U.S. Pat. No. 3,426,161, and entitled "Registration Apparatus for Dictating Machine and Systems," filed Apr. 30, 1965.

Many types of registration or marking devices have been proposed in the prior art for dictating equipment for indicating the relative position of a transducer with respect to a record media during recording or reproducing operations and for effecting some control of the equipment based on such registration. Marking devices take a number of forms, perhaps the most common of which are the advance or forward marker, and the rear marker.

Generally, advance marking devices indicate the point of farthest advance during a dictating interval and are useful in either a machine or a system environment. While rear marking devices have some usefulness in a machine environment, they find particular utility in a system environment for establishing privacy of dictation among a number of dictators who may have access to a common centrally located recording apparatus.

In a machine environment, the operator has direct access to the dictating machine and generally controls the same by means of a combined microphone handset that is connected to the machine by a relatively short cable. The operator of the equipment handles all functions involved, including the loading and unloading of the record media, and has complete control over the various modes of operation of the equipment including recording, reproducing, backspacing, reversing, indexing, and similar functions. In a system environment, the operator of the equipment is generally located at a station that is remotely located with respect to the recording equipment and usually must share such equipment with other remotely located operators through a communications network. Usually, most of the functions available to the machine operator are also available in a system operation with interconnections being established from a remote operator's station to the central dictating apparatus by private wire, leased lines, public telephone facilities, or other communication facilities. Such systems invariably have an attendant at the central dictating apparatus for changing the record media, for monitoring the operation of the equipment, and for handling any problems that may occur.

Frequently, in either a machine or system environment, a person who has just recorded some material during a current dictating interval wishes to backspace or reverse the apparatus some distance in order to review portions of the material. Following such review, he then wishes to continue his dictation beginning at the previous point of farthest advance, that is, the position to which he had previously dictated. In a machine environment, advance marking devices serve to indicate how much of the record media has been used for dictation and conversely, how much remains for use, and also may serve to automatically restore the transducer to the end of the dictated material following a review operation by the operator. In a system environment, advance marking devices offer similar advantages. In addition, in a system environment, a person wishing to review certain of the material just dictated will backspace the central dictating apparatus in order to perform such review, but occasionally will hang up or disconnect prior to the completion of review of the entire material. In a system environment, therefore, advance marking devices serve to automatically restore the transducer to the end of the current dictating interval even in the event a disconnect operation has occurred.

Usually in a machine environment, only one operator has access to a particular dictating equipment. However, in a system environment, many remote stations can usually gain access to a single central recording apparatus. In order to establish privacy of dictation among the various dictators so that a subsequent dictator cannot listen to the material dictated by a previous dictator, rear marking devices have been developed. These devices establish a demarcation or registration point between the material dictated by one person and the material dictated subsequently by another person. In the event a subsequent dictator attempts to review earlier dictated material belonging to another person, whether inadvertently or intentional, rear marking devices prevent such review by deactivating the backspacing or reversing mechanisms in the central apparatus.

Most dictating apparatus includes a transducer for magnetically or mechanically recording and reproducing sound on a record media such as, for example, magnetic sheets or belts or other types of media. Regardless of the record media employed, the recording and reproduction of signals from the record media usually involves moving either the record media or the transducer, or moving the record media and the transducer concurrently thereby establishing a relative movement between the transducer and media. If an endless loop magnetic belt record media is used, as an example, an endless helical recording path is traced by rotating the belt adjacent the transducer in a first direction corresponding to the direction of looping of the belt and concurrently moving the transducer transversely to the direction of movement of the belt by means of a lead screw drive mechanism.

Prior art marking devices generally comprise some form of mechanism, including switch contact elements, that are moved along with the transducer and that are selectively positionable for indicating the relative location of the transducer with respect to the record media. While prior art devices have generally performed very satisfactorily, the inherent elasticity of the switch elements involved may lead to inaccuracies in marking. Such elasticity may result in a premature or a delayed closure of the switch contact elements thereby giving an inaccurate indication of the movement or registration position which it is desired to ascertain. Such inaccuracies may result in the overlapping of one portion of dictated material by a portion that is subsequently dictated or in the event of a rear marking device, one dictator may be able to inadvertently review the material previously dictated by another dictator.

Besides the difficulties noted with respect to marking devices, such devices have generally been characterized by an undue amount of complexity for the result obtained.

Accordingly, an object of the present invention is to provide simplified marking apparatus for dictating equipment.

Another object of the invention is to provide marking apparatus for dictating equipment that is characterized by a high degree of accuracy during its operation.

Still another object of the invention is to provide marking apparatus for dictating equipment that is compatible with either a machine or system environment.

An additional object of the invention is to provide marking apparatus for dictating equipment in which the desirable characteristics of prior art apparatus are retained and the undesirable characteristics minimized.

Another object of the invention is to provide marking apparatus for dictating equipment wherein the requirements of individual operator control and automatic equipment functions, whether in a machine or system environment, are satisfied.

Also, an object of the invention is to provide apparatus for dictating equipment wherein guard zone intervals between successive dictating intervals are established with accurate reference to the basic marking apparatus.

A further object of the invention is to provide marking apparatus which automatically establishes guard zone intervals as an adjunct to the marking operation.

In order to accomplish these and other objects of the invention, marking apparatus is arranged in a first embodiment of the invention with a first memory and control portion for defining an entire recording path on a record media and with a second memory and control portion that cooperates with the first control portion to define with great accuracy the relative location of a transducer and the record media within individual predefined uniform sections of the recording path of substantially equal length. As an example, considering a recording path in the form of a continuous helix traced on the surface of a magnetic belt record media, the first portion of the marking apparatus defines an individual helix within the entire length of the recording path, and the second portion of the marking apparatus defines with great accuracy a particular point of reference within a helix indicated by the first portion of the marking means.

In a second embodiment of the invention, a unique unitary marking apparatus defines advanced and rearward points of reference along the recording path on the record media with great accuracy. The apparatus serves to indicate both a point of farthest advance and a point of reverse movement as the transducer progresses along the recording path thereby marking the limits of a number of dictating intervals and insuring privacy among a number of dictators using the same equipment and whose dictation is recorded in succession on the same record media.

Guard zone intervals are optionally provided for in connection with the first embodiment of the invention while in the second embodiment guard zone intervals are automatically established during the establishment of rear marker indications.

The foregoing and other objects, features, and advantages of the invention will be apparent from the following more particular description of the various embodiments of the invention as illustrated in the accompanying drawings.

In the drawings:

FIG. 1 is a diagrammatic perspective view of a dictating machine in which the invention is incorporated.

FIGS. 2, 2*a*, and 3 represent conditions of mechanisms and circuitry involved in the first embodiment of the invention during a dictating (recording) operation.

FIGS. 4, 4*a*, and 5 indicate conditions of mechanism and circuitry for the first embodiment of the invention during a backspacing and review operation.

FIGS. 6, 6*a*, and 7 display conditions of mechanisms and circuitry that are automatically operable following a review operation to advance the transducer to the end of dictated material.

FIGS. 8, 8*a*, and 9 show various mechanisms involved in the first embodiment of the invention, with FIG. 8 illustrating a restored condition of a portion of the marking memory and FIG. 9 illustrating a memory set condition for the mechanism.

FIG. 10 is a circuit for setting the marking memory mechanisms of FIGS. 8 and 9.

FIGS. 11*a* and 11*b* depict diagrammatically certain mechanisms that are useful in restoring portions of the marking mechanism of the first embodiment of the invention.

Figures 14, 14A, 15:
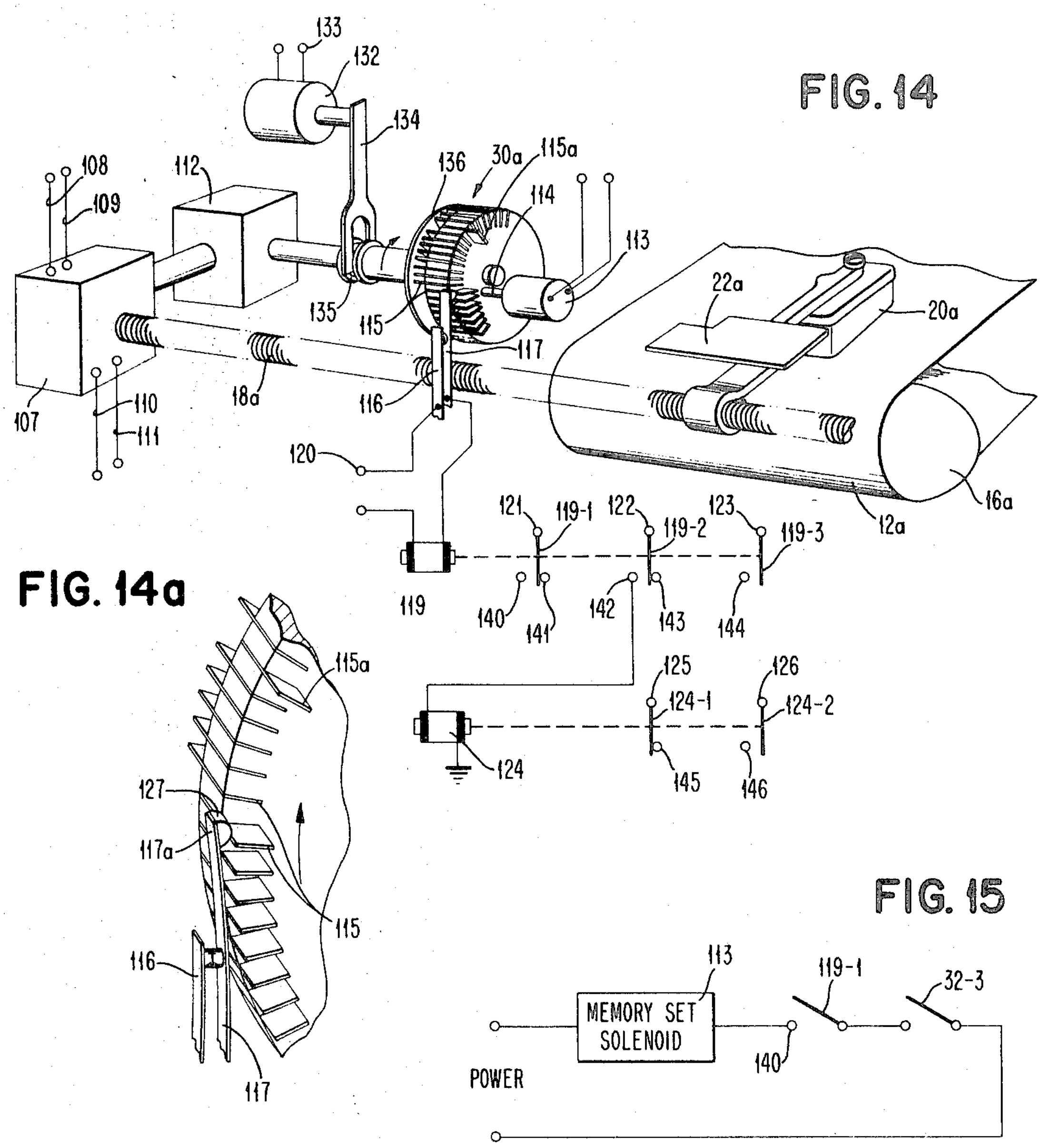
FIG. 14 illustrates mechanism and circuitry for a second embodiment of the invention wherein a single unitary memory marking means serves both to mark forward advance and rearward movement of a transducer with respect to a record media.

FIG. 14*a* represents certain conditions of the unitary marking assembly in FIG. 14.

FIGS. 15, 16, 17, and 18 illustrate a number of circuits involved in setting and using the second embodiment of the marking apparatus in FIGS. 14 and 14*a*.

The dictating equipment herein is not shown in every detail but is generally comparable to that disclosed in U.S. Pat. application Ser. No. 216,261 now U.S. Pat. No. 3,222,460, entitled "Multiple Station Selection System" with N. J. Albanes and M. P. Langendorf as inventors, filed Aug. 10, 1962, and assigned to the same assignee as the present invention.

The first embodiment of the invention will be discussed in connection with a dictating machine shown in FIG. 1 that is directly controlled by an operator. The first embodiment of the invention contemplates the provision of novel mechanism and associated control circuitry for marking the farthest advance during the course of dictation, enabling the operator to review any material that he has dictated, and insuring that the transducer returns to the point of farthest advance upon completion of the review by the operator. Later, the first embodiment will be discussed in connection with a system environment. The second embodiment of the invention will be discussed in operation in a system environment only.

Figures 1, 2, 2A:
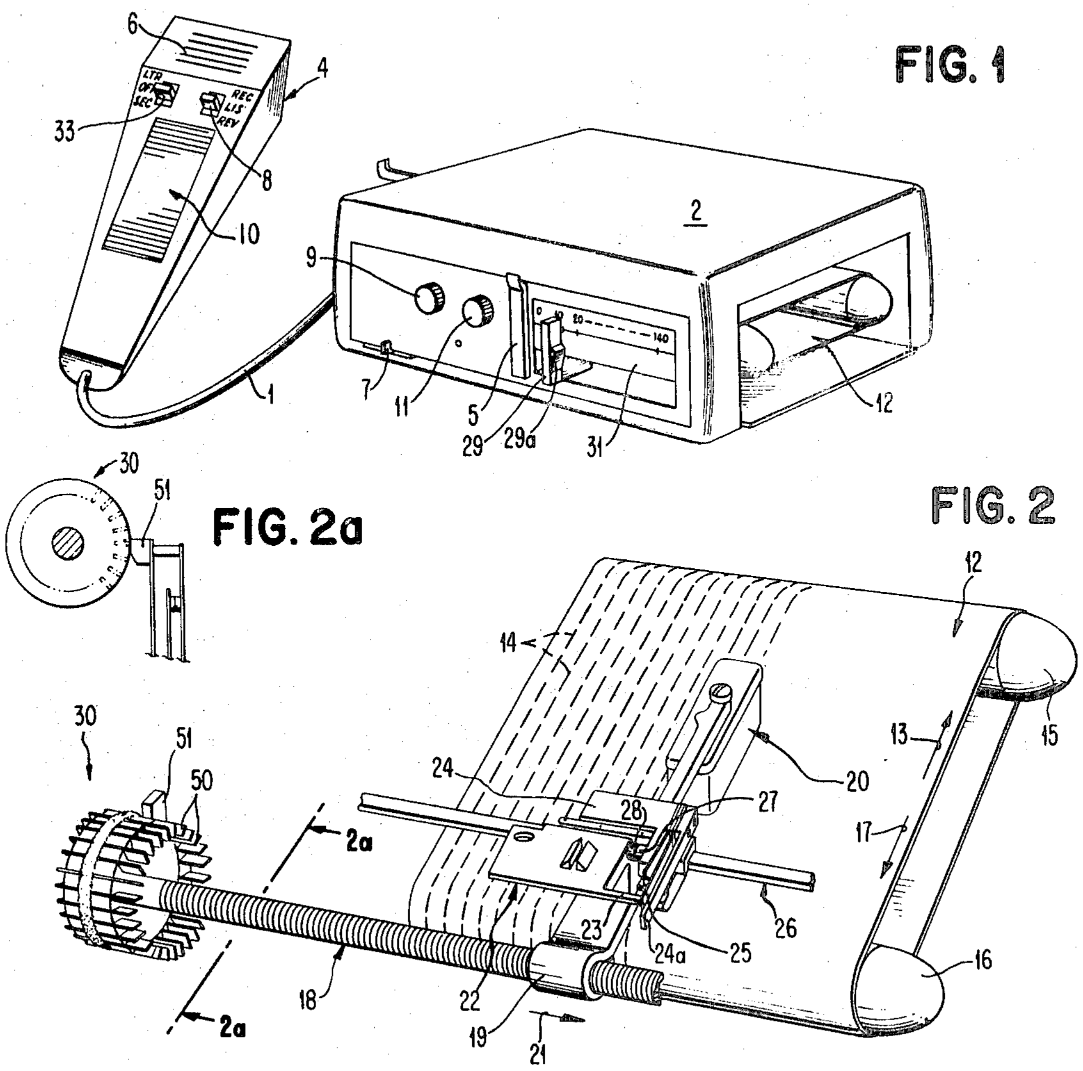

Referring to FIG. 1, a cable 1 interconnects a dictating machine 2 to a combined microphone-handset 4. Machine 2 has various circuits and mechanisms for recording and reproducing dictated material and for giving an indication of the progress of dictation or transcription. A belt release lever 5 is pulled forward to permit the loading of a magnetic belt 12, whereupon the belt release lever 5 is moved again to the position shown in FIG. 1. Signals derived from the microphone portion 6 of the handset 4 are directed by cable 1 to amplifier circuits and from there to a record-reproduce head 20, as in FIG. 2. Head 20 is mounted for lateral movement on a carrier 22 from a home position at the extreme left of belt 12 to an advanced position at the extreme right of belt 12. Belt 12 is mounted on mandrels 15 and 16 and is rotated by mandrel 16 in a forward direction indicated by arrow 13. Under some circumstances belt 12 is rotated in a reverse direction as indicated by arrow 17. Provision may also be made for stepping the transducer 20 in a forward or reverse direction in an incremental fashion referred to as step by step backspacing or forward spacing, as requirements demand. The combined movement of belt 12 as indicated by arrow 13 and the lateral movement of the record-reproduce transducer 20 result in the recording of a helical signal path beginning at the left of belt 12 and continuing to the right extremity of belt 12. In the dictating equipment embodiments described herein, the signal path forms a continuous helix extending across the entire width of the belt. Since belt 12 is an endless loop, the continuous helical path traced by transducer 20 may be considered as comprising a plurality of individual helices, each having a uniform length which corresponds to the distance moved by belt 12 during a single revolution of the belt.

Movement of transducer 20 is under control of lead screw 18. The pitch of threads on lead screw 18 is selected in order that a predetermined number of individual tracks are recorded in succession from the beginning to end of belt 12. In a typical commercial embodiment, belt 12 has an external circumference of approximately 12.8 inches. If lead screw 18 is threaded with a pitch of 40 threads per inch and the width of belt 12 from left to right is 3.5 inches the number of threads per inch times 3.5 provides a total of 140 individual helical tracks across the width of belt 12, each track having a length corresponding approximately to the external circumference of belt 12, that is 12.8 inches. The dimensions given are typical and are presented only for illustrative purposes to later indicate the extreme accuracy that is possible with the various forms of the present invention.

Considering FIG. 1 again, machine 2 has a speed control lever 7, a volume control knob 9, and a tuning or tracking knob 11. Lever 7 permits the slowing down or speeding up of the belt to suit the listener's requirements. Knob 9 controls the volume level during playback. Knob 11 enables the user to position head 20 with a fine degree of control in order to establish proper tracking of a previously recorded path on belt 12.

In addition to transducer 20 for picking up speech signals during recording and for serving as an output during reproduction of signals, microphone handset 4 has a mode control button 8 with three positions: Record (REC), Listen (LIS), and Review (REV). Microphone handset 4 also has an instruction or indexing button 33 with three positions: Letter (LTR), Off, and Secretary (SEC). Handset 4 also has a dictate bar 10.

In order to record material on belt 12, mode control button 8 is moved to the upper Record position. When the user desires to dictate, he depresses dictate bar 10 which results in the movement of belt 12 and head 20 in the manner previously described, and through circuits not shown, signals are recorded on belt 12. In order to listen to previously dictated material, mode control button 8 is moved to the central Listen position, whereupon the drive mechanism in machine 2 is automatically activated to rotate belt 12 and move head 20 and to thereby generate signals for reproduction. If the dictator desires to hear material that he has previously recorded he moves the mode control button 8 down to the lower position for Review purposes. Button 8 is spring loaded from the lower position to the central position. Movement of button 8 in this manner results in a backspacing operation so that head 20 takes up a position one track earlier on belt 12. Each time button 8 is depressed to the lower position in this manner, a backspacing operation will occur. The spring loaded movement of button 8 to the Listen position then enables the user to listen to the previously recorded material derived from transducer 20.

As with most dictating machines, machine 2 is provided with an indexing assembly 29 and associated perforating mechanisms for perforating an index slip 31. Index slip 31 has numerical designations thereon which correspond to the relative location of head 20 in relation to belt 12.

In the example illustrated, index slip 31 has 14 increments respectively designated 0, 10, etc., through 140. Button 33 on handset 4 has upper and lower positions that correspond respectively with the upper and lower channels on index slip 31 for indicating ends of letters and secretary instructions, respectively.

The first embodiment of the marking apparatus comprises two memory control portions, one of which indicates or selects a particular helical track on belt 12, and the other of which indicates or selects a particular point of reference along the track selected by the first portion of the marking means.

The mechanisms and circuitry involved in operation of the first embodiment are illustrated in FIGS. 2—11*b*. Operation of the first embodiment of the marking apparatus will be described in connection with a typical sequence of machine operations involving the dictation (recording) of material, the backspacing and review of portions of the material and the subsequent playback operation to reach the end of the previously dictated material.

During the dictation of material or its subsequent playback, head carrier 22 is driven in a direction indicated by arrow 21 by engagement at 19 with lead screw 18. Concurrently belt 12 is driven as indicated by arrow 13 which effects the recording of the helical tracks 14 on belt 12. Reference is made to the previously mentioned Langendorf et al. application for the mechanical aspects of the drive mechanism. The electrical circuits involved in controlling the drive mechanisms are shown in FIGS. 3, 5, and 7 which depict the status of the circuit during the dictation of material, the review of material, and the recognition that the point of farthest advance has been reached, respectively.

Figure 3:
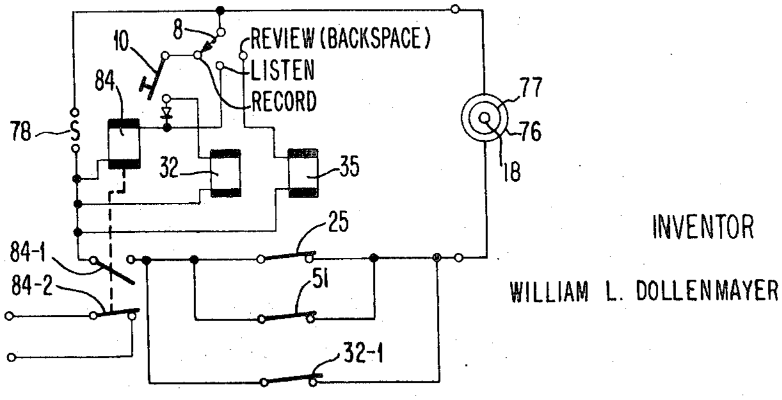
Figures 4, 4A, 5, 6, 6A, 7:
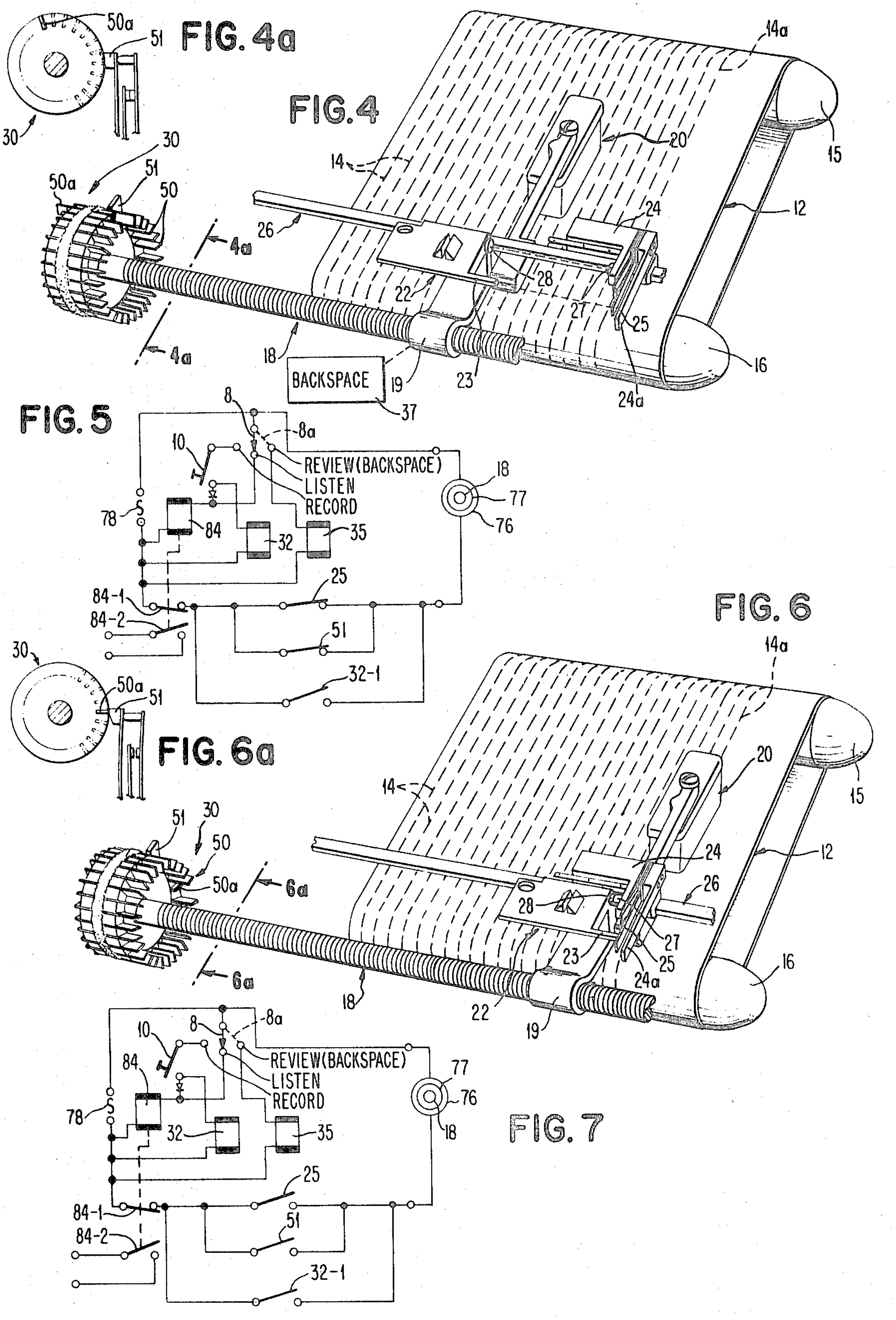

In order to dictate material, mode control button 8 is moved to the upper Record position which corresponds to its position in FIG. 3. The operator of the equipment depresses dictate bar 10 to record material. Depression of dictate bar 10 completes a circuit for energizing a power relay 84 and a Record or function relay 32. With power relay 84 energized, the 84-1 contacts are closed and the 84-2 contacts are opened. A number of circuit paths exist from contacts 84-1 for applying power from a source 78 to motor 76, clutch 77, and lead screw 18. When any of the contacts 25, 51, or 32-1 are closed, a path will exist from power source 78 for energizing clutch 77 in order to rotate belt 12 and move head carrier 22 by engagement with lead screw 18. Contacts 25 are associated with the first control portion of the advance marking mechanism and are primarily under control of the head carrier. Contacts 51 are associated with the second control portion of the advance marking mechanism and are under control of a pinwheel memory unit 30 and associated setting and restoring mechanism shown in FIGS. 8 and 9. During a recording operation, contacts 32-1 are closed, since function relay 32 is energized and the state of contacts 25 and 51 at this time is immaterial in the drive circuit. That is, contacts 25 and 51 may be open or closed and their condition will have no effect on the clutch drive circuit since contacts 32-1 will be the primary controlling influence for connecting power source 78 to clutch 77.

Figures 8, 8A, 12:
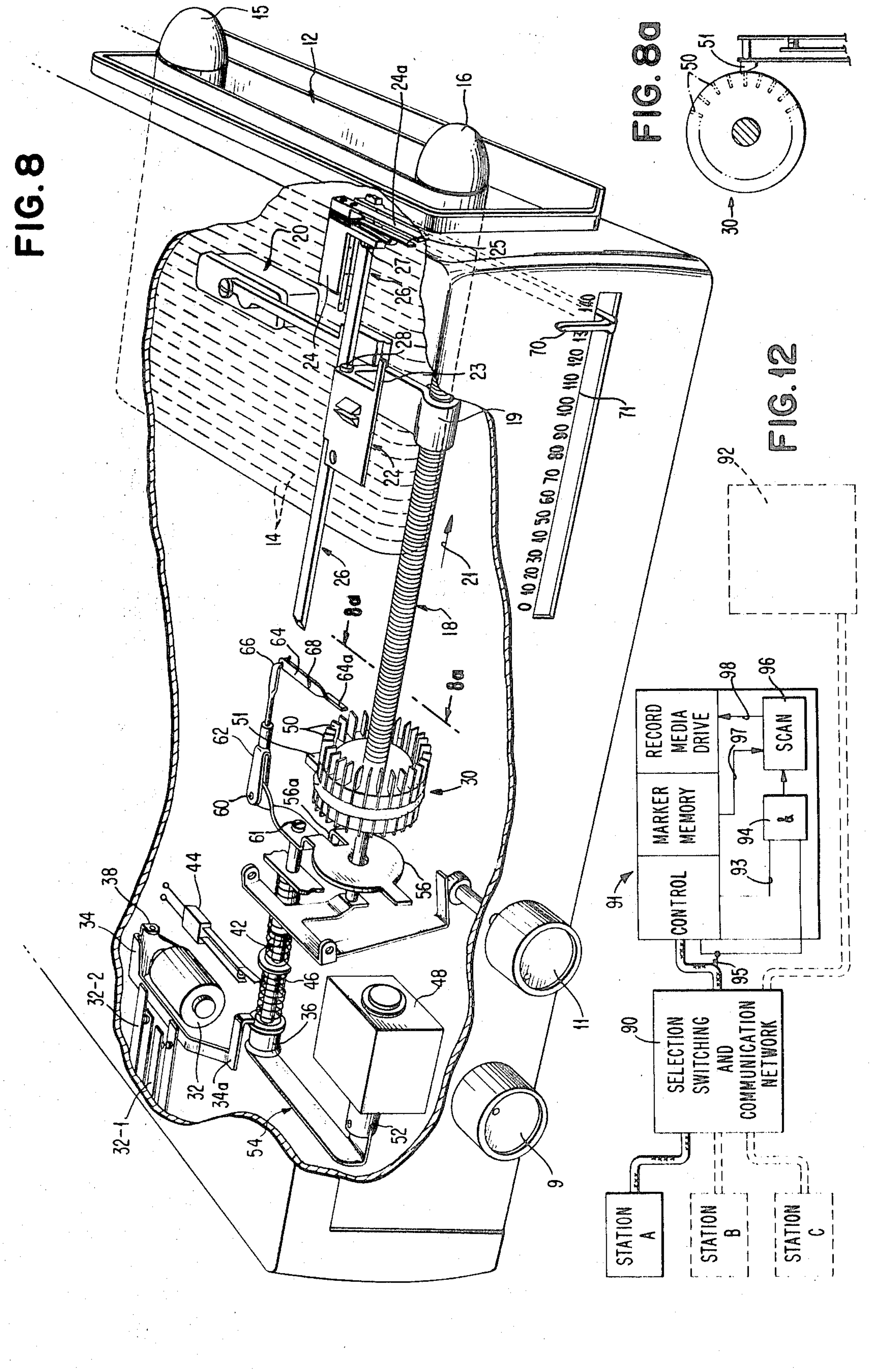
FIG. 12 is a block diagram illustrating a system application for the marking apparatus of the present invention.
Figure 9:
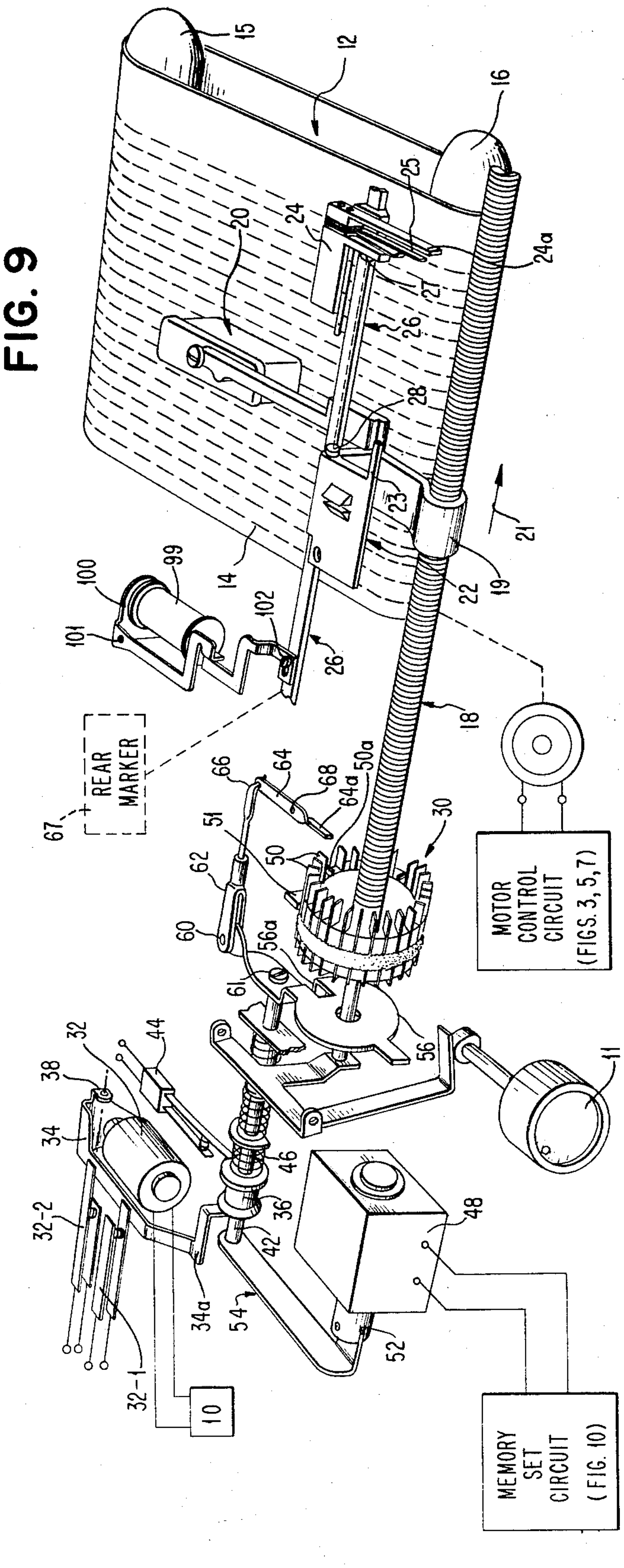

In FIG. 3, with mode control switch 8 in the Record position and the dictate bar 10 depressed, relays 84 and 32 become energized and the closure of contacts 84-1 and 32-1 supply power to clutch 77. The physical configuration of relay 32 is shown in FIGS. 8 and 9. The relay has an associated armature 34 pivoted at 38. Energization of relay 32 pivots armature 34 so that armature extension 34*a* moves in a generally clockwise direction in FIGS. 8 and 9. Movement of extension 34*a* in this manner effects closure of contacts 32-1 that are normally open and also opens contacts 32-2 that are normally closed. The 32-2 contacts are in a memory set circuit in FIG. 10.

Contacts 25, previously indicated as being in the first control portion of the marking apparatus are carried by a switch carrier 24 that is slidably mounted on a rod 26, FIG. 2. Contacts 25 are arranged to be actuated under control of an extension 23 on head carrier 22 under appropriate conditions to be described.

Also associated with this assembly is a contact 27 carried by the switch carrier 24 and a contact 28 carried by the head carrier 22. These are referred to as the "time zero" contacts and are included in the memory set circuit of FIG. 10.

As recording of material proceeds in FIG. 2, switch carrier 24 is moved along ahead of head carrier 22 as head carrier 22 progresses from left to right. Concurrently with the movement of the switch carrier 24, a second memory control portion in the form of a pinwheel memory 30 is rotated. As shown in all FIGS. 2, 4, 6, 8, and 9, pinwheel memory 30 has a plurality of pins 50 that are considered to be unset or inactive when positioned generally to the right and that are set or active when positioned to the left.

Associated with pinwheel memory 30 is a contact assembly 51. Contacts 51 are positioned adjacent the periphery of memory 30 as shown in FIG. 8*a* and are arranged to be operated by any pin, such as pin 50*a*, that has been moved to the left or set condition, as shown in FIGS. 6 and 6*a*. Memory 30 is arranged to complete a revolution during each revolution of belt 12. Therefore, pins 50 in pinwheel memory 30 have a predetermined synchronized and positional relationship with respect to each track 14 on belt 12. During a recording operation, the status of pins 50 in pinwheel 30 has no effect on machine operation. In the first embodiment of the invention, only one pin is preferably set at any time for advance marking purposes.

It is now assumed that the operator of the equipment has dictated material on belt 12 over to a helical track designated 14*a*, FIG. 4.

If the operator of the equipment wishes to review the material that was dictated prior to reaching track 14*a*, he moves mode control button 8 to the Review (backspace) position. This applies power from source 78 to energize a backspace magnet 35 and actuates certain backspacing mechanism 37, FIG. 4, that is shown in detail in the Langendorf, et al. application. Each time mode control button 8 is moved to the dashed line position 8*a*, FIG. 5, backspace magnet 35 is energized and head carrier 22 is moved incrementally one tooth to the left in FIG. 4. When head carrier 22 is moved to the left during backspacing, switch carrier 24 and switch assembly 25 remain at the farthest advanced position to indicate the farthest point of dictated material as shown in FIG. 4.

Prior to the movement of mode control button 8 to the Review (backspace) position in FIG. 5, the pinwheel memory 30 is set to indicate the exact angular position within track 14*a* at which dictation ceased. The setting of memory 30 occurs automatically under control of mechanisms in FIGS. 8 and 9, and the setting circuit of FIG. 10.

Figure 10:
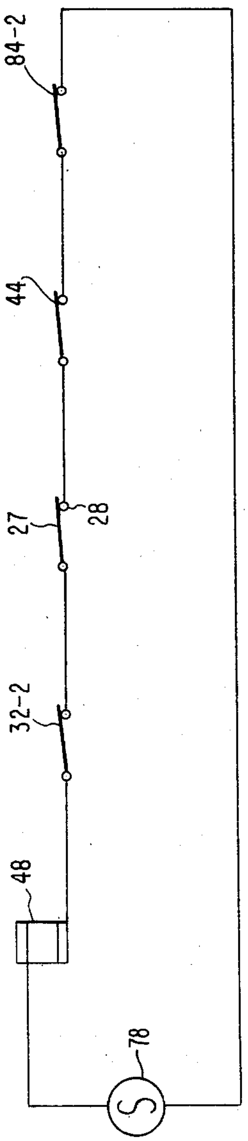

Referring to FIG. 8, the mechanism for setting a particular one of the pins 50 in pinwheel memory 30 includes a memory setting solenoid 48 that is shown in FIGS. 8, 9, and 10. Solenoid 48 has a plunger element 52 connected to a link 54 that extends for connection with a rod 42. Rod 42 carries a bobbin 36 that is biased to the left in FIGS. 8 and 9 by a compression spring 46. A set of contacts 44 are associated with bobbin 36 and are normally closed when bobbin 36 is to the left in its home position as shown in FIG. 8. Contacts 44 are opened when bobbin 36 moves to the right as shown in FIG. 9. When bobbin 36 is to the left in FIG. 8, memory 30 is considered to be in an unset condition and when bobbin 36 is moved to the right as shown in FIG. 9, memory 30 is considered to be in a set condition. The setting of memory 30 under control of solenoid 48 occurs when the operator of the equipment moves mode control button 8 from the Record position to the Listen position as shown in FIG. 5. The setting of the memory is automatic and requires no attention on the part of the operator. Referring to FIG. 10, the circuit for energizing solenoid 48 includes contacts 32-2, 27 and 28, 44, and 84-2. When mode control button 8 is moved from the Record position, Record relay 32 is deenergized. Armature 34 and extension 34a then move generally counter clockwise in FIGS. 8 and 9. Contacts 32-2 that have been maintained open all during the previous recording interval now close as shown in FIG. 10. The energization of solenoid 48 occurs only when head carrier 22 abuts against switch carrier 24 as indicated by the time zero contacts 27 and 28. The pinwheel memory 30 is assumed to have been in a previously unset condition with bobbin 36 to the left as shown in FIG. 8 and contacts 44 are closed at this time. During the instant of time that the mode control button 8 is moved from a record position to the listen position, power relay 84 is momentarily deenergized. This will open contacts 84-1 and close contacts 84-2 momentarily. With all contact closures in FIG. 10 being satisfied, solenoid 48 becomes energized momentarily and moves extension 54 to the right (FIGS. 8 and 9). Bobbin 36 is thereby moved from the extreme left or home position in FIG. 8 to the set position in FIG. 9. Movement of bobbin 36 to this position opens contacts 44 and thereby deenergizes solenoid 48. Movement of rod 42 to the right in FIG. 9 carries bobbin 36 with it and bobbin 36 becomes latched behind the extension 34a were it remains even though solenoid 48 becomes deenergized. Solenoid 48 is energized long enough, however, to move rod 42 to the right in FIGS. 8 and 9. Attached to the end of rod 42 by a screw 61 is a disc member 56 having an opening 56a. Pivotally mounted at 60 to an extension of disc member 56 is a clevis link 62. Link 62 is connected at 66 with a setting lever 64 that is pivotally mounted at 68. Link 64 has an extension 64a that is positioned in proximity to the pinwheel memory 30 and more particularly to one of the pins 50 as a result of the rotation of pinwheel memory 30 concurrently with the rotation of lead screw 18.

Energization of solenoid 48 effects a pivoting of link 64 and extension 64a so that a pin in the memory 30, such as pin 50a, is slidably moved to the left to its set position as indicated in FIGS. 6 and 6a. Pin 50a serves to accurately indicate and mark the exact angular position reached in track 14a during the dictating interval just terminated. Disc 56 is positioned adjacent the ends of all pins 50 in memory 30 so that concurrently with the setting of pin 50a, all other pins are restored to the right or unset condition.

Therefore, prior to any backspacing operation for reviewing previously recorded material, the two memory control portions of the marking mechanism, including switch carrier 24 and associated switch contacts 25, and pinwheel memory 30 including pin 50a, are set to indicate the exact point of farthest advance during the dictating interval just completed.

If desired, an indicator 70 with an associated scale 71 can be provided to supply an indication of the amount of material dictated as well as the amount of space remaining on belt 12 for additional material. Indicator 70 is mounted for movement with switch carrier 24 and therefore reflects the point of farthest advance of carrier 24.

Repeated operation of mode control button 8 to the dashed line position 8a effects a backspacing movement of head carrier 22 to the left and the equipment is placed in a reproduce or playback mode when mode control button is positioned in the central Listen position as shown in solid lines in FIG. 5. When mode control knob is in this position, power relay 84 is energized, but the function control or Record relay 32 is deenergized. Energization of the power relay 84 closes contacts 84-1 and opens contacts 84-2.

If the operator wishes to correct portions of the earlier material, he may do so by moving mode control button 8 to the upper Record position and dictating the new material in a normal manner. Following such dictation, when he again returns to the Listen mode, no change will occur in the setting of memory 30 since switch carrier 24 is physically displaced from carrier 22, the "time zero" contacts 27 and 28 are open, and the circuit of FIG. 10 cannot be activated. However, any time the Record relay 32 is energized armature extension 34a is moved out of latching position with respect to bobbin 36 whereupon bobbin 36 restores to its home position as in FIG. 8. This restores contacts 44 to their normally closed condition but has no effect on the setting of memory 30 at this time.

The advance marking mechanism of the first embodiment is effective when the equipment is placed in a Listen or playback mode to restore head carrier 22 to the exact point of farthest advance reached during the previous dictation interval. Clutch 77 is actuated during a Listen operation under control of contacts 25 and 51 that are wired in parallel, FIG. 5. Contacts 32-1 are closed only when the apparatus is in a record mode of operation and therefore are open as indicated in FIG. 5. When power relay 84 becomes energized, a path from power source 78 exists through contacts 84-1 and contacts 25 and 51 to drive the equipment and particularly head carrier 22 to the point of farthest advance. The energization of clutch 77 is primarily under control of contacts 25 which remain closed until carrier 22 reaches the point of farthest advance shown in FIG. 6. Since pinwheel memory 30 completes one revolution for each revolution of belt 12, pin 50a will come in contact with switch contacts 51 and open them once during each revolution until head carrier 22 reaches the contacts 25. However, until this time, contacts 25 will remain closed and the drive through clutch 77 will continue to be maintained whether contacts 51 open or not.

Eventually, head carrier 22 is moved to the right by lead screw 18 so that extension 23 comes in contact with one of the leaf portions of the switch assembly 25. This will happen when head carrier 22 and head 20 are positioned within the limits of track 14a that was the last track recorded during the previous dictating interval. Extension 23 operates against contacts 25 to open them so that the drive for clutch 77 is then dependent upon the condition of contacts 51 and pinwheel memory 30. Continued rotation of lead screw 18 moves the previously set pin 50a around to the exact angular position that corresponds to the position in which it was previously set, at which time pin 50a acts against the contact assembly 51 to open them. Since all contacts 25, 51 and 32-1 are now open, no circuit exists for energizing clutch 77 and the apparatus will stop with head carrier 22 and head 20 having been restored accurately to the correct angular position in track 14a that was reached during the previous recording interval.

Figure 11A:
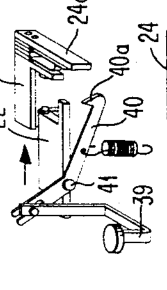
Figure 11B:
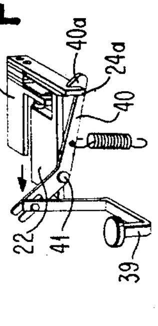

Switch assembly 24 continues to move to the right as recording on belt 12 proceeds. When the entire belt 12 has been recorded upon, it is necessary to restore head carrier 22 and switch carrier 24 to the left for initiating a new recording operation either upon the same belt 12 or upon a different belt. The mechanisms of FIGS. 11a and 11b provide a relatively uncomplicated means for restoring switch carrier 24 to the left. The restoring of head carrier 22 and head 20 to the left is performed by depressing button 29a on index knob 29, FIG. 1. Concurrently with the depression of button 29a and the movement of the index assembly 29 including head carrier 22 and head 20 to the left, another mechanism operated by button 39 is moved all the way to the right to pick up switch carrier 24 and thereafter moved all the way to the left to restore carrier 24 to its home position. Button 39 can be arranged for operation in connection with the index button 29a or as a separate control button. The normal condition of the restore mechanism is shown in FIG. 11a. Movement of the button 39 downward, as in FIG. 11b, results in the rotation of a bellcrank latch 40 in a counterclockwise direction. Latch extension 40a is arranged to latch onto an extension 24a of switch carrier 24. Latch 40 is pivotally mounted at 41 on head carrier 22 and movement of head carrier 22 to the left to its home position will also restore the switch carrier 24 to its corresponding home position in readiness for a new dictating interval.

A system arrangement for either the first embodiment of the marking apparatus, just described, or the second embodiment of the marking apparatus to be discussed, is shown in FIG. 12. The system includes a plurality of remote stations A, B, and C connected through a communication network 90 to a central recording apparatus 91. Each remote station, such as station A, has a control hand piece and transducer such as handset 4, FIG. 1, for effecting various functions in the central recording apparatus 91. The communication network 90 includes selection circuitry, switching circuitry and other circuitry for interconnecting the stations to the recording apparatus 91. Recording apparatus 91 has control circuits, the marker memory apparatus of either the first or second embodiments herein and a record media drive portion comparable to that just discussed. Another central recording apparatus 92 can be selectively connected through network 90 to any one of the remote stations.

If an advance marking apparatus such as that disclosed herein having the switch carrier 24 and the pinwheel memory 30 is incorporated in the central recording apparatus 91 of FIG. 12, its operation would generally be comparable to that previously described. In the system configuration, the advance marking memory would be set when an operator at one of the connected remote stations completes a dictating interval.

The operation of the first embodiment of the marking apparatus in a system environment is comparable to the operation in a machine environment with the exception that additional control lines are necessary in the system environment. When a remote operator at one of the stations such as Station A, for example, is connected to one of the central recording devices 91 or 92, all functions normally available in a machine environment are also available through the communication network 90. During the dictation of material from a remote station, the advance marking mechanism including the switch carrier 24 and associated contacts 25 as well as pinwheel memory 30 and pins 50 are driven in synchronism with the movement of carrier 22 and head 20 across magnetic belt 12.

If the remote operator wishes to review previously dictated material, he changes the mode of the equipment to a Listen mode and this operation results in the setting of pinwheel 30 as before. Subsequently, the remote operator backspaces head 20 and carrier 22 to listen to previously dictated material, as in FIG. 4. The remote operator may keep the equipment in operation long enough to listen to all of the previously dictated material. However, in many cases, the remote operator may be satisfied with only a portion of the previously dictated material and may then hang up the handset at his station which will result in his station becoming disconnected from the central apparatus. The central recording apparatus control section supplies a signal on line 93 to And gate 94 that indicates that the equipment is in a playback mode, for example. A disconnect impulse on line 95 gates another input of block 94. The output of gate 94 is directed to the scan block 96 and, in connection with the marker memory input on line 97, supplies potential to the drive mechanism by line 98 to insure that the mechanism continues to playout to the end of the dictating interval even though the remote station has become disconnected.

Figure 13:
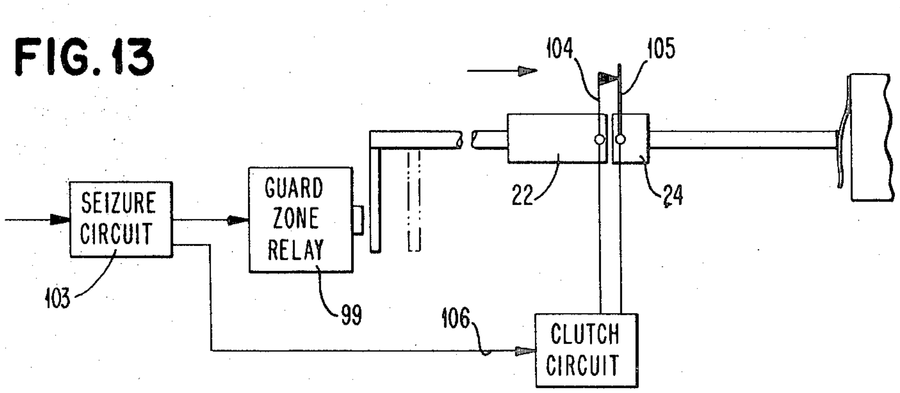
FIG. 13 depicts certain mechanisms and circuitry for establishing a guard zone between successive dictating intervals in a system such as that shown in FIG. 12.

Even though the marking mechanism of the first embodiment disclosed herein provides a high degree of accuracy in locating a reference point on belt 12, it may be desirable in a system environment to also provide a guard zone between successive dictating intervals. For this purpose, a guard zone relay 99, FIGS. 9 and 13 is energized initially when a central recording apparatus, such as central recording apparatus 91 or 92 is first seized by a remote station. In FIG. 9, guard zone relay 99 has an armature 100 pivoted at 101 and connected at 102 to rod 26.

Upon seizure, the seizure circuit 103, FIG. 13 provides potential to the guard zone relay 99 to energize the same. Energization of guard zone relay 99 results in pivoting of armature 100 in a generally clockwise direction in FIG. 9. This imparts a leftward movement to rod 26 and carrier assembly 24. Guard zone relay 99 is maintained energized throughout a particular dictating interval so long as the apparatus remains seized by one of the remote stations shown in FIG. 12. A set of contacts 104 and 105 may be added to the head carrier assembly 22 and switch carrier assembly 24 respectively.

When a remote station becomes disconnected from a recording apparatus, guard zone relay 99 is then deenergized. Deenergization of relay 99 permits rod 26 and switch carrier assembly 24 to move to the right in FIG. 9 a predetermined distance depending upon the effective movement of armature 100. A disconnect signal on line 106 is then used in conjunction with the marker memory apparatus to energize the clutch circuit until the contact 104 on head carrier 22 and the contact 105 on switch carrier 24 again make contact at which time the clutch circuit is deenergized. This effectively establishes a predetermined guard zone interval in a system environment.

The guard zone circuit of FIG. 13 is arranged in the clutch drive circuit to establish a predetermined guard zone interval beyond the accurate point of reference established by the pinwheel memory. The contacts 104 and 105 can be substituted for the contacts 25 and serve to establish a particular helical track displaced perhaps one or two tracks ahead of the last track of recorded dictation with the pinwheel memory establishing an exact reference point within the selected track.

If desired, as indicated by block 67, FIG. 9, a rear marking apparatus similar to that disclosed in copending application Ser. No. 334,210 now U.S. Pat. No. 3,288,941, filed Dec. 30, 1963, entitled "Dictating System" with M. P. Langendorf and L. E. West as inventors and assigned to the assignee of the present invention, may be provided for establishing privacy of dictation in combination with the pinwheel marker memory and switch carrier of the present invention. Also, an additional switch carrier in combination with a pinwheel memory could be arranged for cooperation with the carrier 24 and pinwheel 30 to serve as a rear marker.

However, a preferred arrangement for plural marking functions is disclosed herein as the second embodiment. In a second embodiment of the invention, FIGS. 14—18, the pinwheel memory serves to establish both an advance marking indication and a rear marking indication which has particular usefulness in a system such as that of FIG. 12.

In FIG. 14, lead screw 18a drives head carrier 22a and sound head 20a. Belt 12a is driven by mandrel 16a and a helical path is traced in a manner similar to that previously described. The drive mechanism, shown in block form at 107 preferably has a forward clutch that is controlled by lines 108 and 109 and a rollback or reverse clutch drive that is controlled by lines 110 and 111. Drive 107 is coupled through a reduction mechanism 112 to drive pinwheel memory 30a. In this embodiment of the invention, reduction assembly 112 drives pinwheel memory 30a in such a manner that pinwheel memory 30a completes one revolution during the tracing of the entire helical path on belt 12a. Therefore, in this case, pinwheel memory 30a does not represent a single helical track on belt 12a but represents the entire succession of helical tracks on belt 12a. A memory set solenoid 113 with a plunger 114 is positioned adjacent pinwheel memory 30a for setting the pins in the memory. The pins 115 in pinwheel memory 30a are considered in an unset (active) condition when positioned to the right in FIG. 14 and are considered in a set (inactive)

condition when positioned to the left in FIG. 14. Positioned adjacent the pins 115 is a set of contacts 116 and 117 which control the energization of a pinwheel relay 119 from a power source 120. Relay 119 operates three contacts 119-1, 119-2 and 119-3 to supply potentials from terminals 121, 122 and 123 to various terminals designated 140, 141, 142, 143 and 144.

Under appropriate conditions, a lockout relay 124 is energized from terminal 122, contact 119-2, and terminal 142 and in turn controls the actuation of contacts 124-1 and 124-2 to supply potentials from terminals 125 and 126 to a set of terminals designated 145 and 146.

For convenience, the various relay contacts, such as contacts 119-1 and the terminals, such as terminals 140, 141, etc., in FIG. 14 are separated into circuits which they control in FIGS. 15—18 and are not necessarily exactly correlated with the arrangement in FIG. 14.

Referring to FIG. 14*a*, contact leaf 117 has an extension 117*a* on which a shoe member 127 is mounted. Shoe 127 is arranged to rest on any of the pins 115 that are in an unset condition. The structural configuration is such that as pinwheel memory 30*a* rotates during the recording of information on belt 12*a* FIGS. 14 and 14*a*, the contacts 116 and 117 are closed each time shoe 127 passes over one of the pins 115 that is presently in an unset condition.

Referring to FIG. 15, a circuit is provided for setting pins 115 to the left at periodic intervals during the recording of material on belt 12*a* and the concurrent rotation of pinwheel memory 30*a*. As shoe 127 encounters an unset pin 115, contacts 116 and 117 will be closed when shoe 127 rises sufficiently on the encountered pin 115. The closure of contacts 116 and 117 close a circuit from power terminal 120 to energize relay 119. When relay 119 becomes energized, the associated contacts 119-1, 119-2, and 119-3 are transferred from their positions shown in FIG. 14 to supply potential from terminals 121, 122 and 123 to the terminals 140, 142, and 144. When the apparatus is in a Record mode, function relay 32 is energized and an additionally provided contact 32-3 in FIG. 15 is closed. As soon as contact 119-1 transfers, therefore, a circuit will be completed in FIG. 15 to energize the memory set solenoid 113. Plunger 114 associated with solenoid 113 moves to the left in FIG. 14 and pushes the associated pin 115 to its set condition, thereby permitting shoe 127 to drop slightly and to open contacts 116 and 117 again.

The action just described continues so long as the operator of the equipment maintains the equipment in a Record mode.

Figure 16:
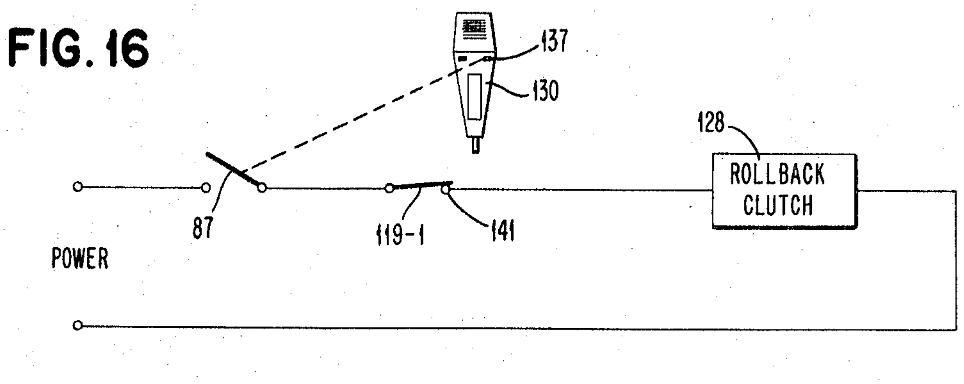
Figure 17:
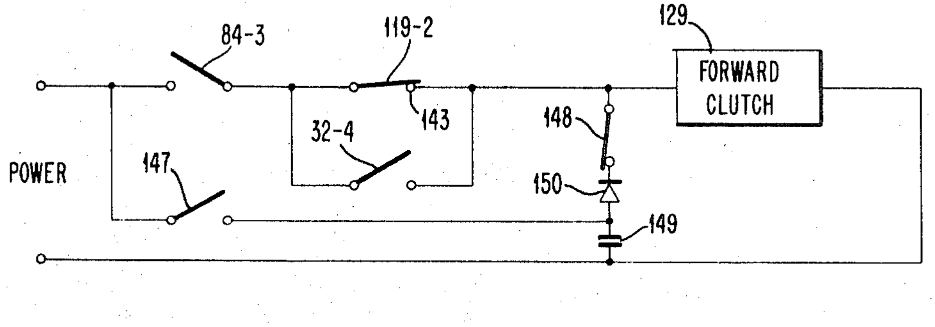

The circuit of FIG. 16 includes a rollback clutch 128 that is incorporated within the block 107 in FIG. 14. The circuit of FIG. 16 is preferably provided in the present embodiment in connection with the marking mechanism instead of an incremental backspacing type circuit as was previously provided for use with the first embodiment of the invention. The circuit of FIG. 17 illustrates a normal playback and dictation circuit for energizing a forward clutch 129 that is also included in the block 107 in FIG. 14. Means are provided in the form of the circuit of FIG. 18 to leave one of the pins in pinwheel memory 30*a* in an unset condition such as pin 115*a*, FIG. 14*a* to indicate the termination of one interval of dictation and the beginning of the next interval.

It will be assumed for purposes of illustration that pin 115*a* was set during a previous dictation interval and now serves as a rear marker during the current dictating interval illustrated in FIG. 14*a*.

Considering the circuit of FIG. 17 first, contact assembly 84-3 is actuated by power relay 84 that was discussed previously in connection with the first embodiment of the invention. Contact 84-3 therefore is closed normally during dictation or playback modes of operation. Also provided in the circuit of FIG. 17 is a contact 32-4 that is additionally provided, like contact 32-3, for operation by function relay 32, previously discussed. During dictation of material, the circuit of FIG. 17 energizes forward clutch 129 through power relay contact 84-3 and function relay contact 32-4.

The circuit of FIG. 16 enables the operator to energize the rollback clutch 128 until a rear marking pin, such as pin 115*a*, FIG. 14*a* is encountered. An additional contact 87 is positioned in handset 130 for closure whenever mode button 137 is operated to the Review position. Contact 87 is included in the rollback circuit of FIG. 16 for energizing the rollback clutch 128 in order to reverse the drive mechanism in block 107. Since the pins 115 are normally and continuously set as dictation progresses, when the mechanism of FIG. 14 is later reversed by energizing clutch 128, shoe 127 associated with contacts 116 and 117 will normally not encounter any pin until a pin that has been left unset as a rear marker is encountered, such as pin 115*a*. Therefore, relay 119, FIG. 14 remains unenergized and potential exists through the 119-1 point and terminal 141 to maintain the rollback clutch 128 continuously energized under control of the operator's microphone handset 130, FIG. 16. Under these conditions, the drive mechanism for head 20*a* will be reversely driven and the pinwheel memory 30*a* will also be operated in a reverse direction. This continues until shoe 127 encounters a previously unset pin, such as pin 115*a*, FIG. 14*a*, at which time relay 119 becomes energized. The energization of relay 119 transfers all of its associated contacts in FIG. 14 and the transfer of these contacts results in the opening of the contact 119-1 associated with terminal 141, FIG. 16 thereby preventing further energization of the rollback clutch 128. While rollback clutch 128 is energized, contacts 147 close and contacts 148 open, FIG. 17. Capacitor 149 is charged through contacts 147 during rollback. When contacts 119-1 open and drop clutch 128, contacts 147 open and contacts 148 close. This completes a discharge path for capacitor 149 through diode 150 to energize forward clutch 129 and move the memory apparatus forward away from the rear marker pin 115*a*.

The circuit of FIG. 15, therefore, prevents the dictator who presently has access to the central recording apparatus from listening to material that was previously dictated by a preceding dictator. Referring again to FIG. 17, a circuit now exists in the Listen or playback mode to energize the forward clutch 129. This circuit includes the power relay contacts 84-3 and the 119-2 normally closed contacts in connection with terminal 143.

The apparatus and circuits for the second embodiment of the invention are predicated on the continuous setting of pins 115 in the pinwheel memory 30*a* to their set condition during a normal dictation interval. At the end of a dictation interval when a dictator becomes disconnected from the central recording apparatus the circuit of FIG. 18 is effective to make the continuous setting operation ineffective so that a single pin, such as pin 115*a*, remains in an unset condition to mark the end of the current dictating interval and hence the beginning of the next dictating interval.

Figure 18:
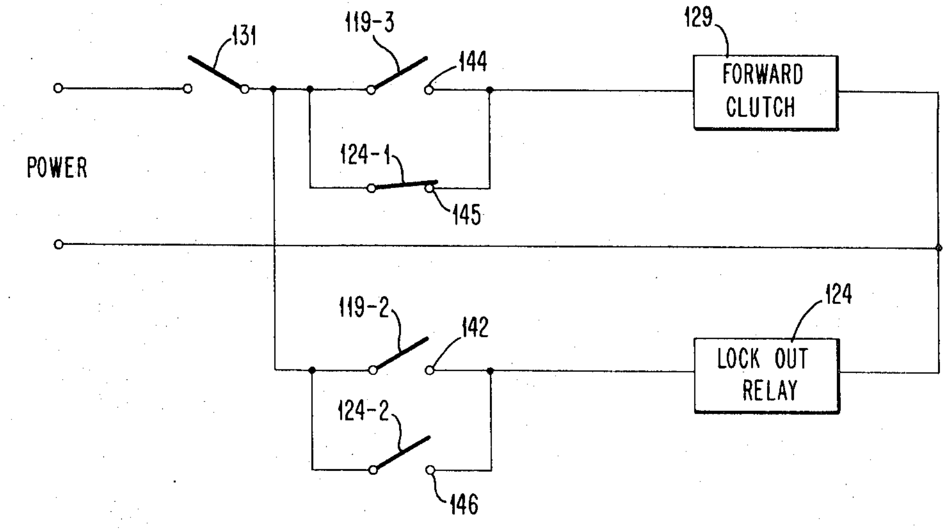

In FIG. 18, contact 131 is closed when a dictator hangs up and disconnects from the central recording apparatus. The circuit of FIG. 18 again includes the forward clutch 129 and a lockout relay 124. Forward clutch 129 is energized through the contact 124-1 and terminal 145 that are under control of the lockout relay 124, FIG. 14. If a dictator has reversed the drive of the apparatus in the central recorder and disconnects prior to the apparatus having reached the point of farthest advance as represented by the last unset pin 115 in the forward direction on pinwheel memory 30*a*, the closure of contact 131 applies potential through contact 124-1 to energize clutch 129 and drive the mechanism forward. As soon as shoe 127, FIG. 14*a*, encounters the first unset pin in the forward direction, relay 119 becomes energized. Contacts 119-1 through 119-3 transfer. The path for memory set solenoid 113, FIG. 15, will remain open at this time since Record relay 32 is not energized and contact 32-3 is open. Therefore the pin encountered by shoe 127 will remain in an unset condition and later serve as a rear marker for the next dictating interval.

The 119-2 points through terminal 142, FIGS. 14 and 18, complete a path for energizing lockout relay 124. This opens the 124-1 point and terminates the circuit path from terminal 145 for energizing forward clutch 129. However, the energization of relay 119 results in the closure of contacts 119-3 to close a circuit path through the terminal 144, FIG. 18, to thereby continue energization of forward clutch 1129. Lockout relay 124 is maintained energized through its own 124-2 point and terminal 146. It is also held in parallel at this time through relay contacts 119-2 and terminal 142. The continued energization of forward clutch 129 through contact 119-3 drives pinwheel memory 30*a* a sufficient distance so that shoe 127 drops into the interval between the first encountered pin in the forward direction and the next pin in succession on memory 30*a*. As soon as shoe 127 drops in this interval, contacts 116 and 117 open, relay 119 becomes deenergized and forward clutch 129 also is deenergized. Both of the contacts 119-3 and 124-1 are now open and the circuit for forward clutch 129 is incomplete at this time, FIG. 18. Contacts 124-2 maintain lockout relay 124 energized so long as the disconnect contacts 131, FIG. 18, are closed. As soon as the communication network connects another station to the central recording apparatus, contacts 131 open and lockout relay 124 becomes deenergized. The circuit is then in readiness for operation at the end of another dictating interval. The net effect of the operation of the foregoing apparatus and circuitry is to leave a single pin in memory 30*a* in an unset condition thereby establishing a rear marker which defines the end of one dictating interval and the beginning of the next succeeding dictating interval. The rear marking pin, such as pin 115*a* in FIG. 14*a*, thereby serves to establish privacy and prevent a succeeding dictator from reversing the apparatus inadvertently into the material dictated by a previous dictator, as previously described in connection with FIG. 16. Due to the automatic interlocking arrangements provided, any unset pin, such as pin 115*a*, also provides a predetermined guard zone interval between successive dictating intervals.

The process of setting or bypassing of pins in pinwheel memory 30*a* continues throughout the progress of recording and playing back of information on belt 12*a*.

Associated with pinwheel memory 30*a* is a memory reset solenoid 132 which, as an example, can be energized under control of the attendant at the central recording apparatus by application of potential from terminal 133. Such energization may be arranged to occur whenever the attendant moves the belt release lever 5, FIG. 1, to remove the belt 12*a* and load a new belt into the apparatus or such energization may be arranged to take place under other circumstances, depending upon system requirements. Energization of solenoid 132 moves a yoke 134 to the right in FIG. 14 and through a spool 135 moves a reset disc 136 against the projecting ends of any pins 115 that were previously set, thereby resetting all pins in readiness for a new sequence of operations.

Considering the first embodiment of the invention, previously discussed, the switch carrier assembly that is similar to those used in prior art devices has been used to best advantage in connection with the pin wheel-type memory 30 for establishing an end zone and an exact point of reference for dictated material with an accuracy and simplicity of operation not previously found in the art. The apparatus of the first embodiment makes use of the advantageous characteristics of prior mechanisms and combines these with the novel pinwheel memory mechanism to achieve a highly novel and useful registration apparatus. Considering again the second embodiment of the invention, a single unitary memory device 30*a* serves both as an advance marker and a rear marker and provides both of these functions in a simplified and uncomplicated manner. Also due to its configuration, the second embodiment of the invention provides a guard zone between successive dictating intervals in a simplified manner. The memory device 30*a* may also be used, if desired, in a machine environment such as that discussed in connection with the first embodiment, for advance marking purposed only or for combined advance marking and rear marking, in either case, thereby eliminating the necessity for the switch carrier 22 and contacts 25 provided in the first embodiment.

If a unitary marking memory with both advance marking and rear marking capabilities, such as that of the second embodiment, is incorporated in a machine environment, the advance marking characteristics may serve their normal function. As an example, the rear marking characteristics can be used to good advantage to simply define dictating intervals in the reverse direction by operation a lamp or other indicator, since a machine environment seldom requires the privacy function needed in a system environment.

While the invention has been particularly shown and described with reference to several embodiments, it will be understood by those skilled in the art that various changes in form and detail may be made without departing from the spirit and scope of the invention.

I claim:

1. Control apparatus for dictating equipment having a transducer with provision for recording and reproducing signals on a record media, comprising:

unitary registration means, said registration means having a plurality of elements positioned at predetermined intervals corresponding to recording intervals on said record media and extending in an ordered array of elements having a start position and end position corresponding respectively to the start of recording on said media and the end of recording on said media, said elements being settable to active and inactive positions for indicating the relative position of said transducer with respect to said media, reset means operable to set all of said elements to an active position prior to recording on said record media;

means operable during a recording interval to sequentially set said elements to their inactive positions as recording proceeds;

means responsive to termination of a recording interval to drive said head, said media, and said registration means for a predetermined distance, to deactivate said sequential setting means and to thereby leave a single active element in position to mark the end of the recording interval just completed and the beginning of the next recording interval;

and means operable during any reverse operation initiated during said next recording interval for terminating said reverse operation when said active element is encountered.

2. Control apparatus for dictating equipment having a transducer and provision for recording and reproducing signals on a record media, comprising:

unitary registration means, said registration means having a plurality of elements positioned at predetermined intervals corresponding to recording intervals on said record media and extending in an ordered array of elements having a start position and end position corresponding respectively to the start of recording on said media and the end of recording on said media, said elements being settable to active and inactive positions for indicating the relative position of said transducer with respect to said media;

reset means operable to set all of said elements to an active position prior to recording on said record media;

means operable during a recording interval to sequentially set said elements to their inactive positions as recording proceeds;

means under control of said registration means during a dictating interval when the relative registration of said transducer and said media differs from that indicated by said registration means for restoring said transducer and said media to the point of registration indicated by said registration means;

means responsive to termination of a recording interval to drive said head, said media, and said registration means for a predetermined distance, to deactive said sequential setting means and to thereby leave a single active element in position to mark the end of the recording interval just completed and the beginning of the next recording interval;

and means operable during any reverse operation initiated during said next recording interval for terminating said reverse operation when said single active element is encountered.

3. Marking apparatus for a dictating system including a central recording apparatus, a plurality of remote operator stations, a communication network, said network including selecting and switching circuits for operatively connecting one of said stations to said central recording apparatus, a record-reproduce head at said central apparatus, and drive means for relatively driving said head and a record media to trace a signal path on said media, said apparatus comprising:

unitary marking means driven by said drive means in synchronism with the relative movement of said head and said media, said marking means having a plurality of marking elements positioned at predetermined intervals corresponding to recording intervals on said record media and extending in an ordered array of elements having a start position and end position corresponding respectively to the start of recording on said media and the end of recording on said media, said elements being settable to active and inactive positions for indicating the relative position of said head with respect to said media along said helical path;

reset means operable to set all of said elements to an active position prior to recording on said record media;

means operable during a dictating interval to sequentially set said marking elements to their inactive positions as recording proceeds;

means responsive to disconnection of a connected remote station to drive said head, said media, and said marking means for a predetermined distance, to deactivate said sequential setting means and to thereby leave a single active marking element in position to mark the end of the dictating interval just completed and the beginning of the next dictating interval;

and means operable during any reverse operation initiated from a subsequently connected second station for deactivating said reverse drive means when said active marking element is encountered.

4. Marking apparatus for dictating equipment having a record-reproduce head and drive means for relatively driving said head and a record media to trace a signal path along said media, said apparatus comprising:

marking means driven by said drive means in synchronism with the relative movement of said head and said media, said marking means having a plurality of marking elements positioned at predetermined intervals corresponding to recording intervals on said record media and extending in an ordered array of elements having a start position and end position corresponding respectively to the start of recording on on said media and the end of recording on said media, said elements being settable to active and inactive positions for indicating the relative position of said head with respect to said media along said helical path;

reset means operable to set all of said elements to an active position prior to recording on said record media;

means operable during a dictating interval to sequentially set said marking elements to their inactive positions as recording proceeds;

means responsive to the positioning of said head rearwardly from the last unset marking element in the forward direction for operating said drive means to retract the previously recorded path until the said last unset marking element in said marking means is encountered;

means responsive to termination of dictation to drive said head, said media, and said marking means for a predetermined distance, to deactivate said sequential setting means and to thereby leave a single unset marking element in position to mark the end of the dictating interval just completed and the beginning of the next dictating interval;

and means operable during any reverse operation initiated during a subsequent dictating interval for supplying an indication that said single unset marking element has been encountered.

5. Marking apparatus for a dictating system including a central recording apparatus, a plurality of remote operator stations, a communication network including selecting and switching circuits for operatively connecting one of said stations to said central recording apparatus, a record-reproduce head at said central apparatus, and drive means for relatively driving said head and a record media to trace a helical signal path on said media, said apparatus comprising:

unitary marking means driven by said drive means in synchronism with the relative movement of said head and said media, said marking means having a plurality of marking elements positioned at predetermined intervals corresponding to recording intervals on said record media and extending in an ordered array of elements having a start position and end position corresponding respectively to the start of recording on said media and the end of recording on said media, said elements being settable to active and inactive positions for indicating the relative position of said head with respect to said media along said helical path;

reset means operable to set all of said elements to an active position prior to recording on said record media;

means operable during a dictating interval to sequentially set said marking elements to their inactive positions as recording proceeds;

means responsive to the positioning of said head rearwardly from the last unset marking element in the forward direction for operating said drive means to retract the previously recorded path until said unset marking element in said marking means is encountered;

means responsive to disconnection of a connected remote station to drive said head, said media, and said marking means for a predetermined distance, to deactivate said sequential setting means and to thereby leave a single marking element in position to mark the end of the dictating interval just completed and the beginning of the next dictating interval;

and means operable during any reverse operation initiated from a subsequently connected second station for deactivating said reverse drive means when said single unset marking element is encountered.

6. Marking apparatus for a dictating system, comprising:

a central recording apparatus;

a plurality of remote operator stations, each of said stations having means for controlling the operation of said central recording apparatus to record and reproduce dictated material;

a communication network including selecting and switching circuits for operatively connecting one of said stations to said central recording apparatus;

mode control circuitry at said central recording apparatus for establishing its mode of operation under control of any connected operator station, including a record mode and a reproduce mode;

a record-reproduce head at said central apparatus;

means at said central apparatus mounting a record media adjacent said head;

drive means for relatively driving said head and said media to trace a helical signal path along said media;

marking means driven by said drive means in synchronism with the relative movement of said head and said media, said marking means having a plurality of marking elements positioned at predetermined intervals corresponding to recording intervals on said record media and extending in an ordered array of elements having a start position and end position corresponding respectively to the start of recording on said media and the end of recording on said media, said elements being settable to active and inactive positions for indicating the relative position of said head with respect to said media along said helical path;

reset means operable to set all of said elements to an active position prior to recording on said record media;

means operable during a dictating interval to sequentially set said marking elements to their inactive positions as recording proceeds;

means under control of an operator at a connected remote station for reversing said drive means to thereby reverse the movement of said head along the path recorded during the current dictating interval;

means under control of said remote operator for subsequently operating said drive means and said head to retrace the previously recorded path until the first active marking element in said marking means is encountered;

means under control of an operator at a connected remote station for disconnecting said remote station from said central recording apparatus;

means responsive to disconnection of said remote station to drive said head, said media, and said marking means for a predetermined distance, to deactivate said sequential setting means and to thereby leave a single marking element in an active position to mark the end of the dictating interval just completed and the beginning of the next dictating interval;

and means operable during any reverse operating initiated from a subsequently connected second station for deactivating said reverse drive means when said single active marking element is encountered.

7. Marking apparatus for a dictating system, comprising:

a central recording apparatus;

a plurality of remote operator stations, each of said stations having means for controlling the operation of said central recording apparatus to record and reproduce dictated material;

a communication network including selecting and switching circuits for operatively connecting one of said stations to said central recording apparatus;

mode control circuitry at said central recording apparatus for establishing its mode of operation under control of any connected operator station, including a record mode and a reproduce mode;

a record-reproduce head at said central apparatus;

means at said central apparatus mounting a record media adjacent said head;

drive means for relatively driving said head and said media to trace a helical signal path along said media;

a pinwheel marking means driven by said drive means in synchronism with the relative movement of said head and said media, said marking means having a plurality of marking pins settable to active and inactive positions for indicating the relative position of said head with respect to said media along said helical path;

means operable during a dictating interval to sequentially set said pins to their inactive positions as recording proceeds;

means under control of an operator at a connected remote station for reversing said drive means to thereby reverse the movement of said head along the path recorded during the current dictating interval;

means under control of said remote operator for subsequently operating said drive means and said head to retrace the previously recorded path until the first active marking pin in said marking means is encountered;

means under control of an operator at a connected remote station for disconnecting said remote station from said central recording apparatus;

means responsive to disconnection of said remote station to drive said head, said media, and said pinwheel for a predetermined distance, to deactivate said sequential setting means and to thereby establish a guard zone and leave a single pin in position to mark the end of the dictating interval just completed and the beginning of the next dictating interval;

and means operable during any reverse operation initiated from a subsequently connected second station for deactivating said reverse drive means when said single pin is encountered.